No. 653,715. Patented July 17, 1900.
J. T. VAN GESTEL.
APPARATUS FOR ELECTRICALLY TREATING FABRICS FOR WATERPROOFING OR OTHER PURPOSES.
(Application filed Nov. 1, 1898.)
(No Model.) 6 Sheets—Sheet 1.

WITNESSES
INVENTOR
Jean Theodore Van Gestel
BY
ATTORNEY

No. 653,715. Patented July 17, 1900.
J. T. VAN GESTEL.
APPARATUS FOR ELECTRICALLY TREATING FABRICS FOR WATERPROOFING OR OTHER PURPOSES.
(Application filed Nov. 1, 1898.)
(No Model.) 6 Sheets—Sheet 2.

Attest
Inventor
Jean Theodore Van Gestel
By Joseph L. Levy
ATTORNEY

No. 653,715. Patented July 17, 1900.
J. T. VAN GESTEL.
APPARATUS FOR ELECTRICALLY TREATING FABRICS FOR WATERPROOFING OR OTHER PURPOSES.
(Application filed Nov. 1, 1898.)
(No Model.) 6 Sheets—Sheet 3.

WITNESSES

INVENTOR
Jean Theodore Van Gestel
BY
Joseph L. Levy
ATTORNEY

No. 653,715. Patented July 17, 1900.
J. T. VAN GESTEL.
APPARATUS FOR ELECTRICALLY TREATING FABRICS FOR WATERPROOFING OR OTHER PURPOSES.
(Application filed Nov. 1, 1898.)
(No Model.) 6 Sheets—Sheet 4.

WITNESS
INVENTOR
Jean Theodore Van Gestel
BY
Joseph L. Levy
ATTORNEY

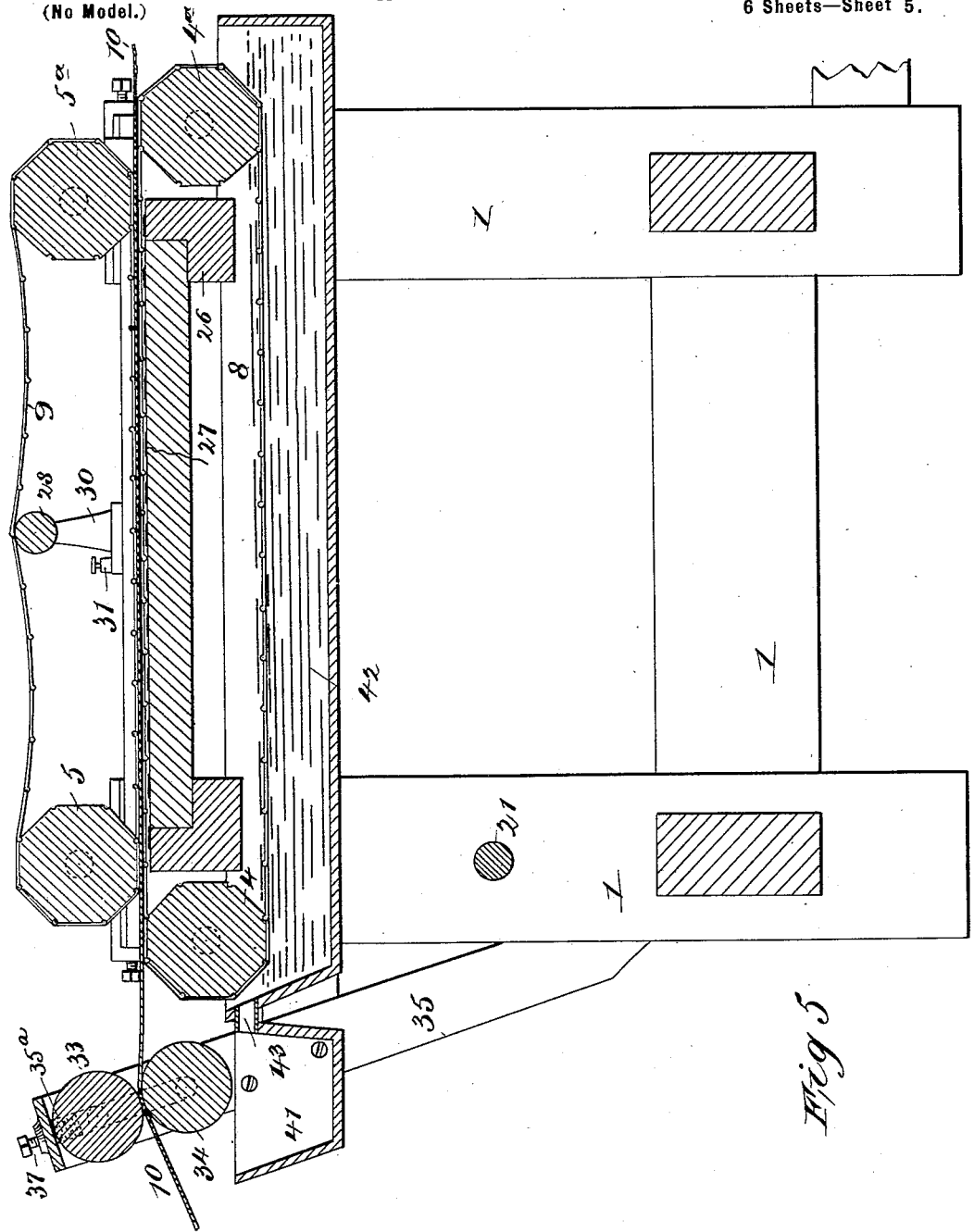

No. 653,715.  
J. T. VAN GESTEL.  
APPARATUS FOR ELECTRICALLY TREATING FABRICS FOR WATERPROOFING OR OTHER PURPOSES.  
(Application filed Nov. 1, 1898.)
Patented July 17, 1900.
(No Model.)
6 Sheets—Sheet 6.
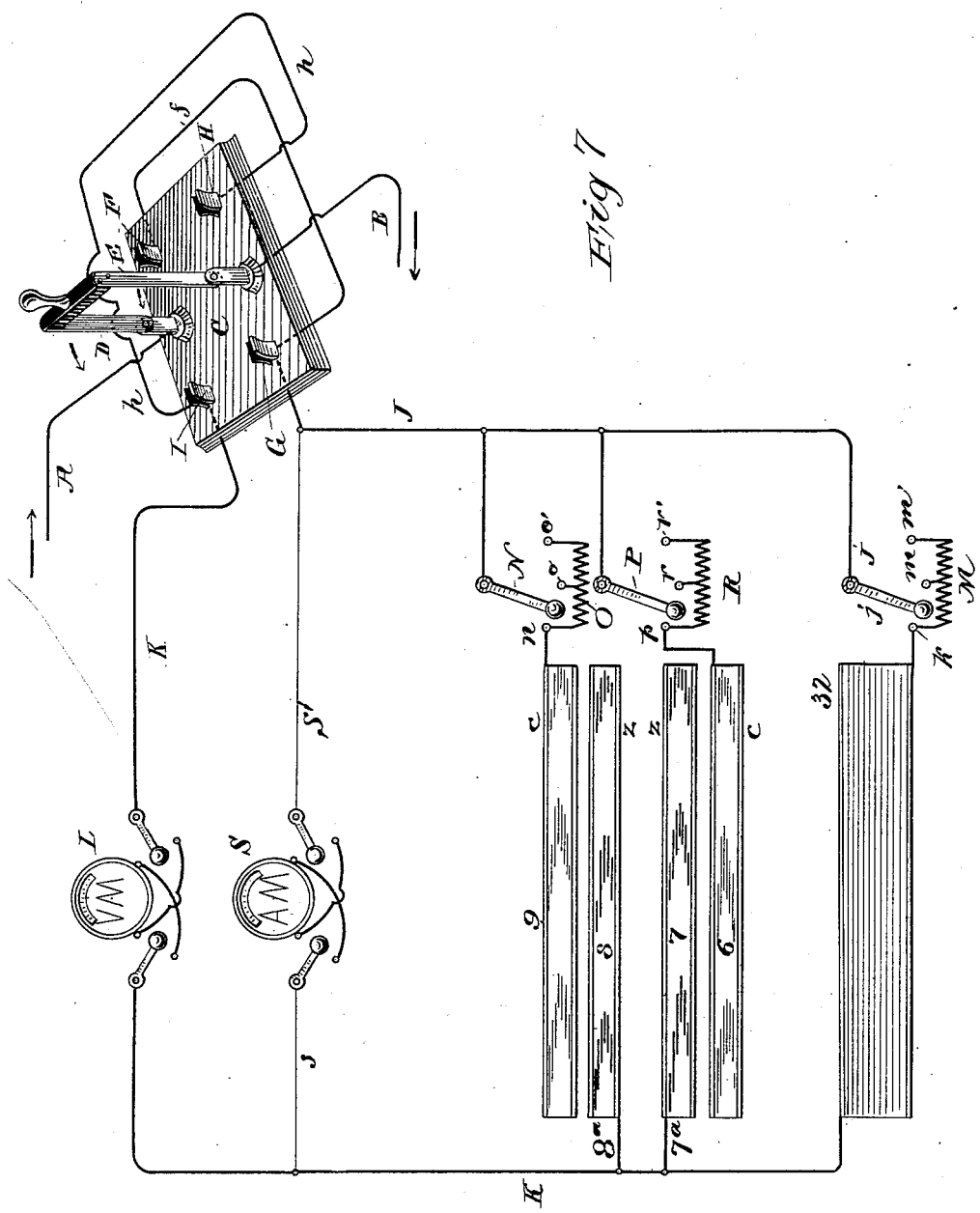
WITNESSES
INVENTOR  
Jean Theodore Van Gestel  
BY  
ATTORNEY

UNITED STATES PATENT OFFICE.

JEAN THEODORE VAN GESTEL, OF NEW YORK, N. Y.

APPARATUS FOR ELECTRICALLY TREATING FABRICS FOR WATERPROOFING OR OTHER PURPOSES.

SPECIFICATION forming part of Letters Patent No. 653,715, dated July 17, 1900.

Application filed November 1, 1898. Serial No. 695,181. (No model.)

*To all whom it may concern:*

Be it known that I, JEAN THEODORE VAN GESTEL, a citizen of the United States, residing in the city, county, and State of New York, have invented a certain new and useful Apparatus for Electrically Treating Fabrics for Waterproofing or other Purposes, of which the following is a specification.

This invention relates to an apparatus for use in rendering fabrics waterproof by means of electricity.

The object of the invention is to provide for electrically waterproofing fabrics in large pieces or quantities and in uniformly and thoroughly effecting such treatment.

To this end the invention consists in the construction, arrangement, and combination of parts, substantially as hereinafter fully described and claimed.

Figure 1:
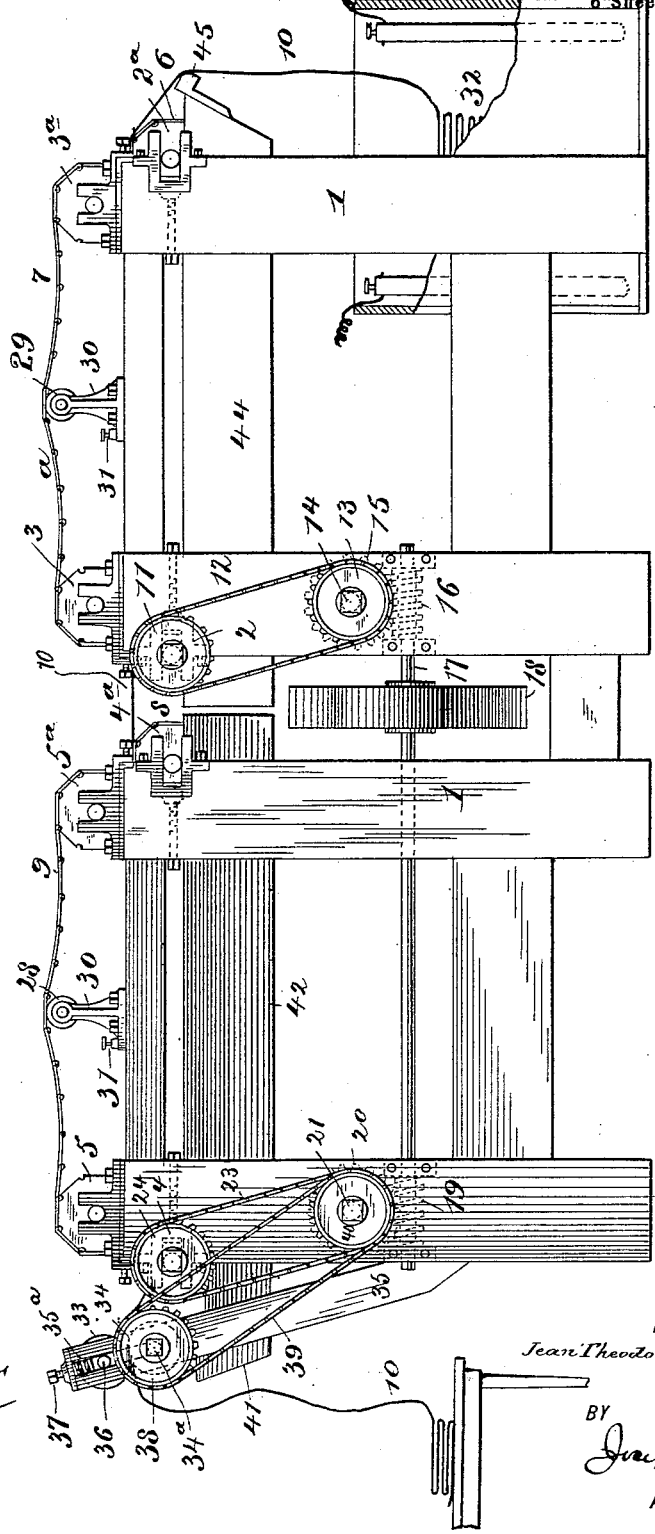
Figure 2:
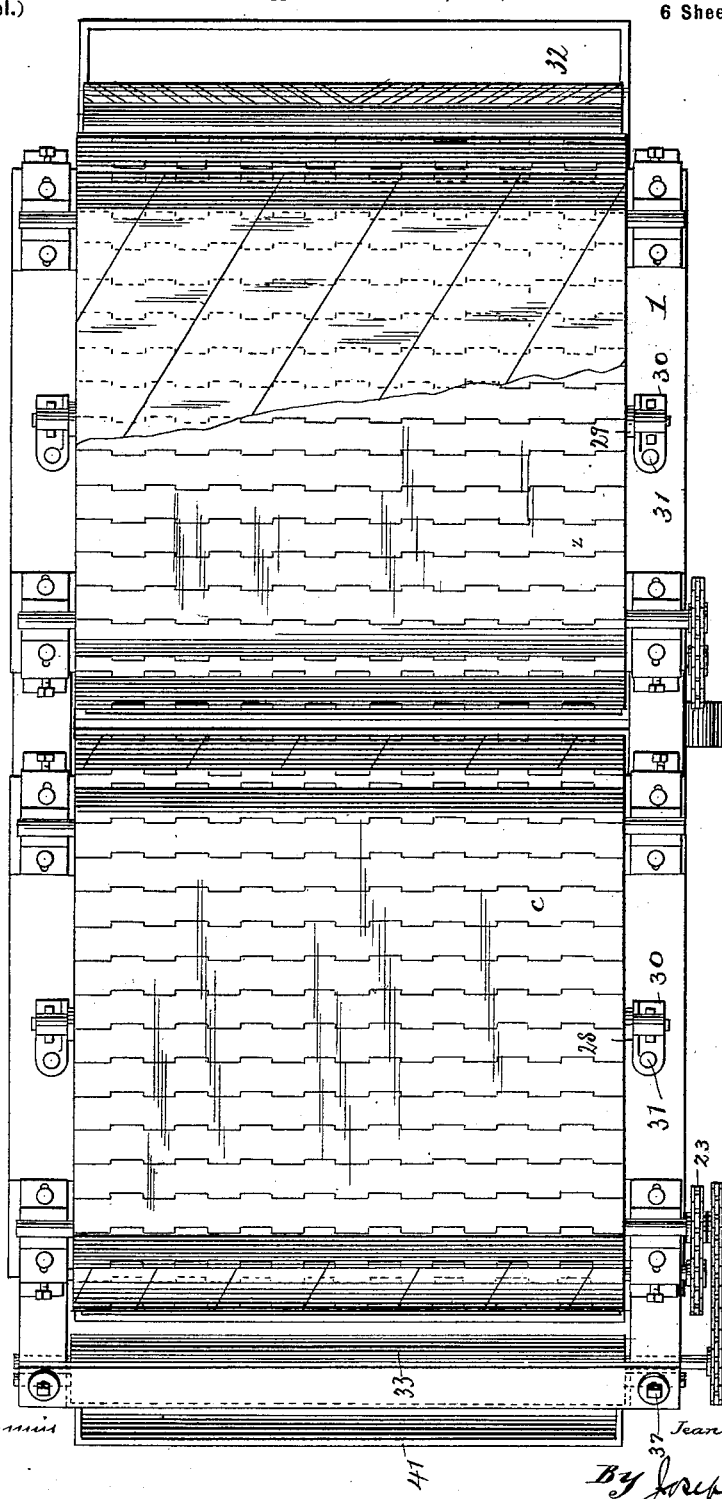
Figure 3:
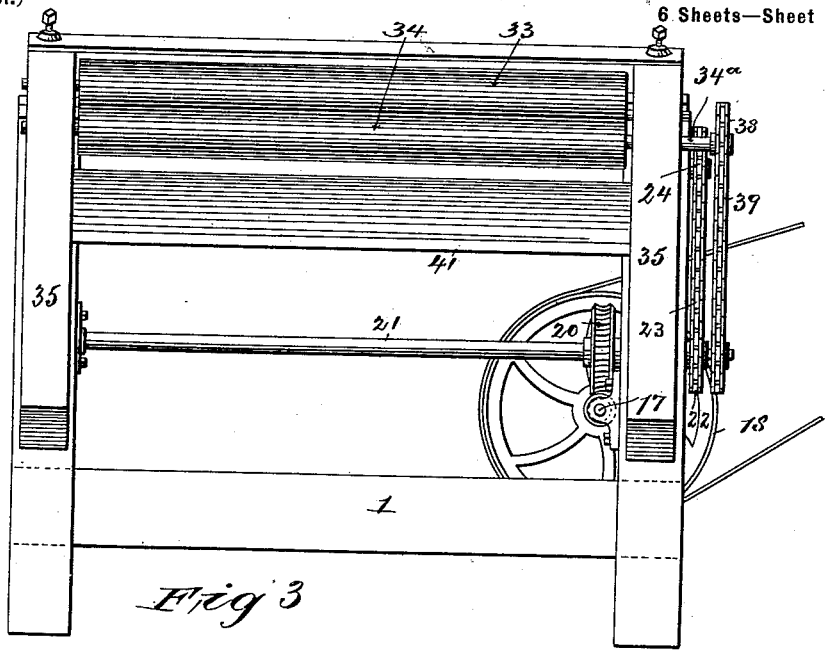
Figure 6:
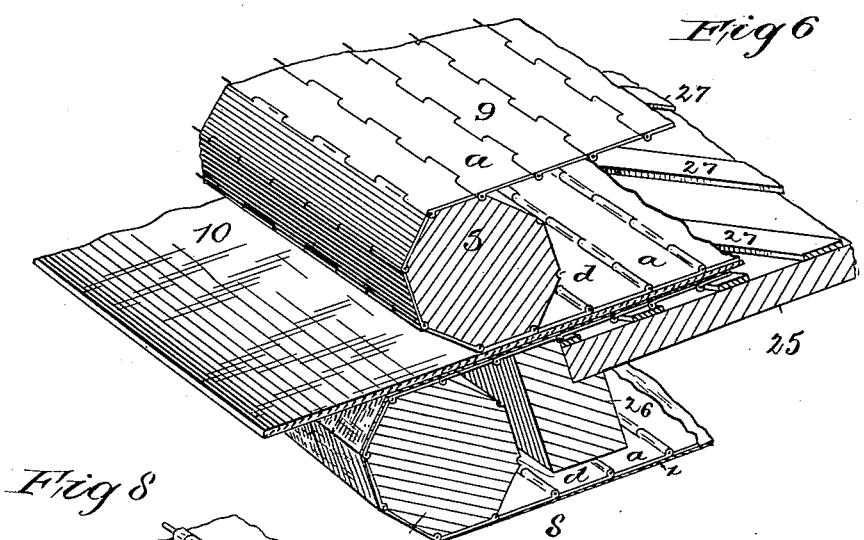
Figure 8:
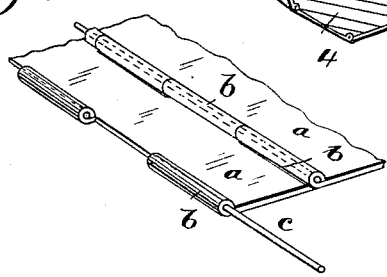
Figure 4:
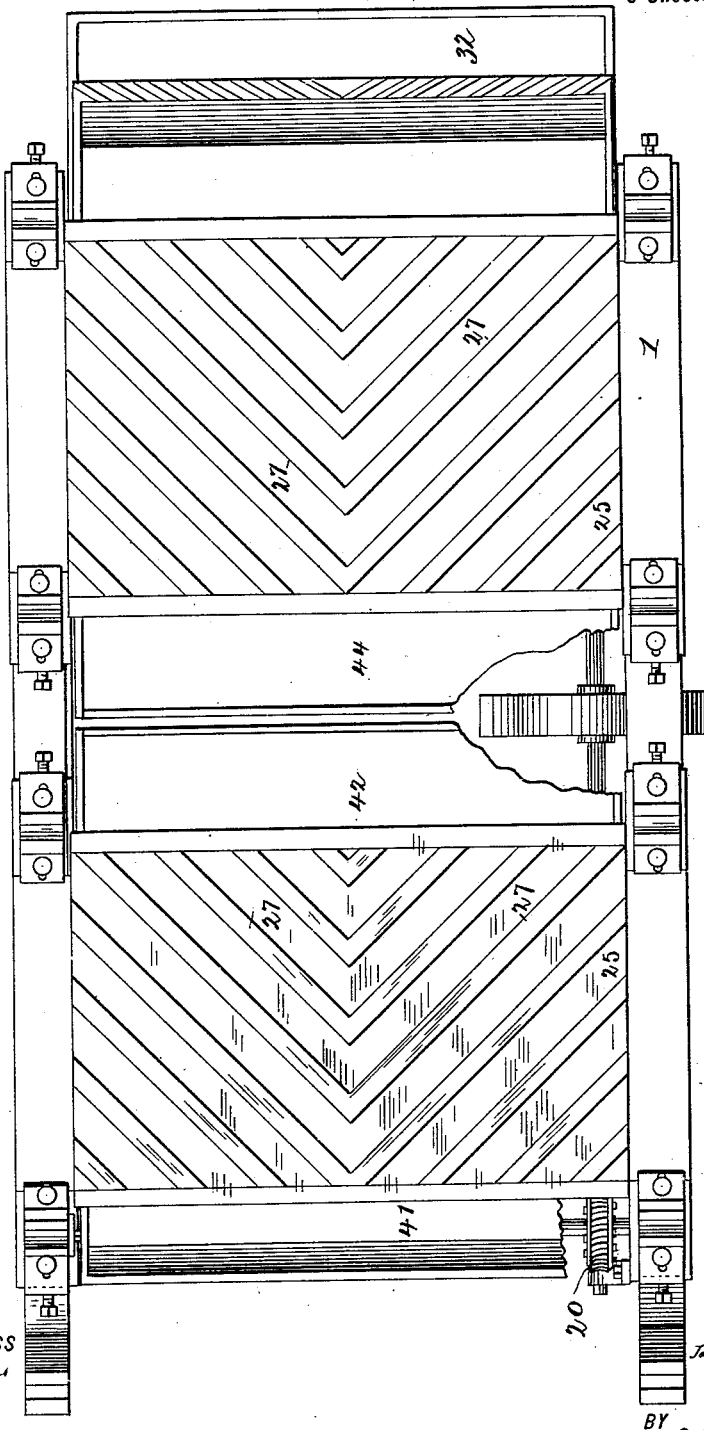

In the accompanying drawings, which form a part of this specification, Figure 1 is a side elevation of an apparatus embodying my invention. Fig. 2 is a plan view thereof, part of one belt being broken away. Fig. 3 is an end view, parts being removed. Fig. 4 is a partly-broken plan view of the frame of the apparatus, the belts and rollers being removed. Fig. 5 is an enlarged central section through one end of the machine. Fig. 6 is a detail sectional view showing the belts, their rollers, and the support for the belts between the rollers, which also serves to conduct electricity to one of the belts. Fig. 7 is a diagrammatic view illustrating circuits, &c., for controlling the current in its action on the fabric; and Fig. 8 is a detail showing the manner of connecting the plates of the metallic belt.

1 indicates the main frame of the apparatus in two half parts similar to each other, which may be of any suitable construction. At one end of each of the separate frames are journaled two pairs of drums or rollers 2 2$^a$ and 3 3$^a$, the pair 3 3$^a$ being above the pair 2 2$^a$. The drums or rollers are mounted on spindles journaled in bearings carried by frame 1, the bearings being arranged so that the drums can be moved toward and from each other. At the opposite end of frame 1 are journaled two other pairs of drums or rollers 4 4$^a$ 5 5$^a$, the spindles of which are journaled in adjustable bearings carried by frame 1. Around each pair of drums an endless band or apron passes, as 6 7 8 9. The adjacent rollers 2 3, 2$^a$ 3$^a$, 4 5, and 4$^a$ 5$^a$ are so located that the corresponding bands or aprons will lie near each other or in contact, so as to receive a piece of cloth or fabric 10 between them and carry it along as they travel. The spindle or roller 2 is shown provided with a sprocket-wheel 11, that receives a chain 12, which passes over a sprocket-wheel 13, secured on a shaft 14, journaled in frame 1, and 15 is a worm-wheel secured to shaft 14 and in mesh with a worm 16, carried by a shaft 17, journaled in frame 1, and having a pulley 18 to receive a belt from a suitable source of power. The shaft 17 also carries a worm 19, that meshes with a worm-wheel 20, carried by a shaft 21, journaled in frame 1. On shaft 21 is secured a sprocket-wheel 22, from which a chain 23 passes over a sprocket-wheel 24, secured to the spindle of drum or roller 4. By this means as shaft 17 is rotated the drums 2 and 4 will be rotated simultaneously and at the same speed, whereby the bands or aprons 6 8 will be carried along at equal speeds, and the bands 7 9 will be carried along by their contact with bands 6 8, and thus the cloth 10, that is between the bands, will be carried through the machine. It is evident, however, that other means than that shown may be provided for operating the drums and bands.

The endless bands or aprons 6 7 8 9 are to be made of metal and of a suitable metallic combination or couple for electrical purposes—such, for instance, as copper and zinc for the negative and positive elements, respectively, or any other suitable couple best adapted to obtain the most favorable result with the nature of the cloth or fabric subjected to treatment. Where I use two pairs of endless metallic bands or aprons, I prefer that the lower band of one pair and the upper band of the next pair shall serve as a positive element and that the upper band of the first-mentioned pair and the lower band of the second-mentioned pair shall serve as the negative element, or, in other words, the relative locations of the positive and negative elements of the pairs of bands are reversed. By this means I am enabled to treat both sides of the fabric alike as it passes through the apparatus. For convenience of description I will call the bands 6 and 9 the "positive" bands or elements, composed, for instance, of zinc, and the bands 7 and 8 the "negative" bands or elements, composed, for instance, of copper. By preference one band of each pair is covered with muslin $x$ or a similar non-conductor to prevent short-circuiting of the pairs of bands when the fabric 10 is not between them.

The bands or aprons 6 7 8 9 are made of a plurality of plates hinged together, and as they are all of substantially the same construction a description of one will suffice for all.

$a$ are plates (of the character described) which extend parallel to the drums 4 5, &c., and these plates are hinged together, so as to make continuous electrical contact. I have shown the plates as having eyes $b$, alternating on opposite sides and adapted to receive a metal pin $c$, that connects them, whereby the bands can bend as they pass around the drums. I have shown the drums or rollers as polygonal, preferably octagonal, and at the corners of the faces or sides of the drums are longitudinal recesses $d$ to receive the eyes $b$ of plates $a$, so that the plates $a$ will lie snugly against the faces of the drums. The drums are preferably made of wood, or they may be insulated from frame 1, the object being to prevent short-circuiting from the bands to the frame.

It will be understood that the bands or aprons are to form part of an electric circuit and that the bands of each pair serve the one as an anode and the other as a cathode, the bands 6 and 9 being the anodes and the bands 7 and 8 the cathodes of a suitably-arranged circuit having connection with a suitable source of electrical energy.

Beneath the upper web or portion of the lower bands or aprons 6 8 are located tables 25, preferably of non-conducting material, as wood, suitably supported by the frame 1 and extending between the drums of the respective bands, being shown supported by crossbeams 26. Upon the table 25 are a series of parallel metallic strips 27, preferably in rectangular arrangement, as shown in Fig. 4, and these strips are in such position that the plates $a$ of the bands 6 8 will rest upon them, thus making electrical contact therewith, whereby the corresponding part of the band will be properly supported on a level or plane and the band above may press upon the same to make firm contact with the fabric or cloth 10 therebetween. The diagonal positions of the strips 27 relatively to the bands permit the bands to slide freely without undue wear and tear. The strips 27 are to be connected with the circuit or line, which may be accomplished as follows: The upper bands 7 and 9, which also form part of the circuit, are shown passing over rollers 28 29, carried by standards 30, mounted on frame 1, these rollers and standards being preferably metallic and insulated from the frame 1, 31 being binding-posts carried by the standards for connection with the feed-wire. These rollers thus serve the double purpose of supporting the upper web of the bands 7 and 9 and of forming part of the circuit for the bands.

I provide a tank or receptacle 32, adapted to contain pure water, and in this tank or bath are located two terminals of the electric circuit, preferably of zinc and oxid of manganese or any other suitable electric anode and cathode. The cloth or fabric to be treated is soaked in the tank and during that time the current is allowed to flow through the tank. Then one end of the cloth or fabric is placed between the bands or aprons 6 7 and the machine is set in operation. The current is to be first passed through the bands 6 7 and the cloth therebetween, and after the cloth is passed between these bands it is placed between the bands or aprons 8 9, and it is then subjected to the influence of the current passing through the last-mentioned bands. After the fabric or cloth has traveled between the bands 8 9 it is preferably passed between two rubber rollers 33 34, shown journaled in arms 35 projecting from frame 1. The roller 33 is shown held against roller 34 by means of springs $35^a$, that act against the shaft 36 of said rollers, which shaft travels in slots in the arms 35, adjusting-screws 37, carried by the arms 35, serving to regulate the pressure between the rollers 33 34. On the shaft $34^a$ is secured a sprocket-wheel 38, over which passes a chain 39, that also passes around a sprocket-wheel 40 on shaft 21, whereby as drum 4 is rotated the roller 34 will be rotated at a corresponding speed. The pressure-rollers 33 34 act to squeeze out the surplus water from the fabric 10, and therefore said fabric may be rolled or folded in any practical manner and hung up to dry. In this operation it is necessary to avoid bringing the cloth or fabric in contact with any metal or metallic surface before it is absolutely dry, as the effect of the galvano-magnetic current in waterproofing the fabric would be injured thereby.

41 is a tank or receptacle carried by frame 1, beneath the rollers 33 34, to receive the water that is squeezed out of the fabric. 42 is a tank or receptacle carried by frame 1, beneath the rollers 4 $4^a$, in which the lower web of band 8 travels, and these receptacles 41 42 are shown connected near their upper parts by a tube 43. (See Fig. 5.)

44 is a tank or receptacle carried by frame 1, beneath the rollers 2 $2^a$, in which the band 6 travels, and at its front end the tank 44 is provided with a lip or wearing-surface 45, over which the fabric or cloth 10 may pass from the tank 32. By having the bands 6 and 8 travel through water in the tanks 42 and 44 said water will act to wash from said bands such impurities as may have been collected thereon, and the surplus water may be let off by conduits or pipes.

In Fig. 7 I have illustrated in diagram a convenient electrical arrangement for passing the desired current through the bath 32 and through the anodes and cathodes between which the fabric is to be passed for the waterproofing treatment, and in said figure the parts marked 6, 7, 8, and 9 correspond to the pairs of bands previously described. In said figure, A B are the feed-wires, which lead to a switch C, having pivotal arms D E, connected, respectively, with the wires A B, the switch shown being of an ordinary type and adapted to reverse the direction of the current, as may be desired. From a contact-post F extends a wire $f$, that leads to a contact-post G, and from a contact-post H extends a wire $h$, that leads to a contact-post $l$. J is a conductor leading from the contact-post G to the switch $j$, and K is a conductor leading from contact-post I, preferably through a voltmeter, and connected with a contact $k$ through the bath 32, the line K and the contact $k$ being connected with the terminals in the bath 32. By preference the contact $k$ is connected with a resistance coil or rheostat M, that has contacts $m$ $m'$, adapted to be engaged by the switch $j$, as is also the contact $k$. When it is desired to pass the current through the bath 32, the switch $j$ will be placed upon one of these contacts to regulate the passage of the current through the bath, so that it shall be stronger or weaker, as may be desired, in accordance with the fabric to be treated. The conductor J is connected with a switch N, and the cathode or band 9 is connected with a contact $n$, that is also connected with a resistance-coil or rheostat O, to which are connected contacts $o$ $o'$, and the cathode or band 8 is connected with conductor K, as by a wire $8^a$. By this means when the wet cloth or fabric is in contact with the elements 8 9 more or less current can be passed through the same by means of the switch N and rheostat O. The conductor J is also connected with a switch P, and the cathode or band 6 is connected with a contact $p$, that is also connected with a resistance-coil or rheostat R, to which are connected contacts $r$ $r'$, and the anode or band 7 is connected with the conductor K, as by a wire $7^a$, by which means when the wet cloth or fabric is between the elements 6 7 the desired amount of current can be passed through the same by means of the switch P and rheostat R. S is an ammeter connected with the conductors J K, as by wires $s$ $s'$. By means of the meters L S the quantity and strength of the current passing can be determined by inspection, as it is very important in the carrying out of this process that the proper current be utilized in accordance with the character of the fabric being treated.

The process, in connection with the apparatus and the circuits illustrated, is carried out as follows: The fabric or cloth to be waterproofed or made water-repelling is placed in the water in the tank 32, the switch D E is turned down so that the parts D E will engage the spring-contacts F H, respectively, and the current is thrown on the line running to said bath by turning the switch $j$ to one of the contacts $k$, M, or M', the circuit being as follows: from A through D, F, $f$, G, J, $j$, $k$, M, or M' to the electrode in the bath 32, through the bath to conductor K, and then through contact-post I, conductor $h$, contact-post H, and arm E to conductor B, while the switches N P are open. When the switch $j$ is on the contact $k$, the full current will pass through the galvanic bath, and the subsequent electric action will be capable of producing a better result than if the fabric were not first subjected to the galvanic bath. Switch $j$ is next opened, and the cloth is passed between the bands, or the anode and cathode 6 7 and switch P is moved to the contact $p$, $r$, or $r'$, according to the current that it is desired shall pass through the fabric, the circuit being established as follows: from A through D F $f$ G J P and $p$, $r$, or $r'$ and the rheostat, through 6, through the fabric, and through 7 to $7^a$, K, $h$, H, and E to the line B. The bands 6 7 being set in motion carry the cloth along between them, and the current, passing from the band 6 to the band 7, causes a decomposition of the water into its component elements—viz., HO—whereby hydrogen is liberated at the cathode 7 and oxygen is combined with the metallic oxid at the band 6 and is forced into the cavities or cells of the fabric, as it appears to me, whereby the fibers or the fabric becomes waterproofed or water-repellent, and the result is most likely derived by a combination of the oxygen with the metallic oxid. Within the present state of science, however, no absolute knowledge bearing upon the subject seems to apply, and I cannot state exactly what action takes place; but the fact is that the electric current, acting upon the metallic couple or the plates on the opposite sides of the wet fabric, causes oxidation to take place and produces a peculiar waterproofed or water-repellent effect upon the fabric. A metallic oxid of some kind is produced through the nascent oxygen, due to the electrolytic action of the current on the water in the goods, which is probably combined with the fibers both mechanically and chemically, thereby making the same waterproof or water-repellent by the presence of the oxid carried into or upon the fiber or the goods by the current. Thus it will be seen that the oxid produced between the elements 6 7 is carried into or upon the goods on one side, as on that side in contact with the band or cathode 6, and in order to have the same effect upon the other side of the goods the goods are next passed between the bands 8 9, in which the band of copper is on the opposite side of the goods on which the copper 6 acted. The switch P is opened and the switch N closed on one of the contacts N, O, or O', the circuit being as follows: from A through D F ƒ G J N and contacts n, o, or o', through the rheostat to 9, through the fabric to 8, and through 8ª, K, I, h, H, and E to the line B, and the same action above described takes place, depositing the oxid onto the other side of the goods, whereby both sides of the goods are treated alike. The goods are then carried between the rollers 33 and 34 and the water squeezed out, and then the goods are dried.

One section of the apparatus may be used alone and the whole structure may be varied in detail without departing from the invention.

Having described my invention, I claim—

1. An apparatus, for electrically treating fabric to render it waterproof, consisting of a source of electric current, a bath provided with suitable electrodes, two frames or sections each provided with endless, traveling, conducting belts, the electrodes of the bath and the conducting-belts being arranged in parallel circuits or branches and each of said branches being provided with a graduated resistance substantially as and for the purpose set forth.

2. An apparatus, for electrically treating fabric to render it waterproof, consisting of a source of electric current, a bath provided with suitable electrodes, two frames or sections each provided with endless, traveling, conducting belts, the electrodes of bath and conducting-belts being arranged in parallel circuits or branches, and a pole-changing switch for reversing the current through said conducting-belts, substantially as and for the purpose set forth.

3. In an electrical waterproofing and shrinking apparatus the combination of a frame, a pair of coacting endless bands or aprons, one of which is composed of an oxidizable metal and the other being an electric conductor, means for supporting and operating said bands, a tank or receptacle to form a bath for the goods to be treated, and means for directing an electric current through said bath and through said bands when a moistened fabric is between them, substantially as described.

4. In an electrical waterproofing and shrinking apparatus the combination of a frame, a pair of coacting endless bands or aprons, one of which is composed of an oxidizable metal and the other being an electric conductor, means for supporting and operating said bands, one or more metal plates carried by said frame upon which one of said bands can slide, means for directing electric current through said plate or plates and the band in contact therewith, and means for completing the circuit through the other band, substantially as described.

5. In an electrical waterproofing and shrinking apparatus the combination of a frame, a pair of coacting endless bands or aprons, one of which is composed of an oxidizable metal and the other being an electric conductor, means for supporting and operating said bands, one or more metal plates upon which one of said bands can slide, a contact carried by said frame in electrical circuit with the other band, and means for directing current through said bands, plate and contact, substantially as described.

6. In an electrical waterproofing and shrinking apparatus the combination of a frame, a pair of coacting endless bands or aprons, one of which is composed of an oxidizable metal and the other being an electric conductor, means for supporting and operating said bands, one or more metal plates upon which one of said bands can slide, a metal roller carried by said frame to make electrical contact with the other band, and means for directing current through said bands, plate and roller, substantially as described.

7. In an electrical waterproofing and shrinking apparatus the combination of a frame, a pair of coacting endless bands or aprons, one of which is composed of an oxidizable metal and the other being an electric conductor, means for supporting and operating said bands, a plurality of metal plates carried by said frame in rectangular arrangement upon which one of said bands can slide and make electrical contact, a contact engaging the other band, and means for directing electric current through said plates, the bands and said contact, substantially as described.

8. In an electrical waterproofing and shrinking apparatus the combination of a frame, a pair of coacting endless bands or aprons, one of which is composed of an oxidizable metal and the other being an electric conductor, means for supporting and operating said bands, a tank or receptacle for water into which one of said bands extends and through which it travels, and means for directing an electric current through said bands, substantially as described.

9. In an electrical waterproofing and shrinking apparatus the combination of a frame, a pair of coacting endless bands or aprons, one of which is composed of an oxidizable metal and the other being an electric conductor, means for supporting and operating said bands, a second pair of endless bands composed of similar materials, the oxidizable band of one pair being diagonally opposite the similar band of the other pair, means for supporting and operating the second-mentioned pair of bands, and means for directing electric current alternately through the pairs of bands, whereby fabric will be similarly treated on both sides in its passage through the apparatus, substantially as described.

10. In an electrical waterproofing and shrinking apparatus the combination of a frame, a pair of endless bands, means for supporting and operating them, one of said bands being of an oxidizable metal, means for directing electric current through said bands, a pair of squeezing-rollers to receive fabric from said bands, means for supporting and operating said rollers, a receptacle beneath one of said bands adapted to contain water to wash the band, a receptacle beneath said rollers, and a passage-way between said receptacles, substantially as described.

11. In an electrical waterproofing and shrinking apparatus the combination of a frame, two pairs of opposed bands, drums arranged in pairs and carrying said bands, means for directing electric current through each pair of bands, a sprocket-wheel connected with a drum of each pair of bands, a shaft carrying two worms, worm-wheels meshing therewith, sprocket connected with said wheels, chains connecting said sprocket-wheels with the sprocket-wheels of said drums, a pair of squeezing-rollers, a sprocket connected with one roller, a sprocket connected with one worm-wheel, and a chain connecting said sprocket with the sprocket of the roller, substantially as described.

12. In an electrical waterproofing and shrinking apparatus, the combination of a frame, drums supported thereby, endless bands, forming anodes and cathodes, supported on said drums, line-wires connected with a source of electricity, circuits, arranged in multiple arc, between said line-wires and passing through said endless bands, a rheostat and switch in each of said circuits and means for reversing the direction of the current on said line-wires, substantially as described.

13. In an electrical waterproofing and shrinking apparatus, the combination of a tank, a frame, drums journaled in said frame, endless bands forming anodes and cathodes mounted on said drums, means for driving said drums, line-wires connected with a source of electricity, circuits, arranged in multiple arc, between said line-wires and passing through said bands and tank, a rheostat and switch in each of said circuits and means for reversing the direction of the current on the line-wires, substantially as described.

14. In an electrical waterproofing and shrinking apparatus, the combination of a frame, drums mounted on said frame, sets of endless bands, forming anodes and cathodes, mounted on said drums, metal plates on which one endless band of each set rests, line-wires connected with a source of electricity, circuits, arranged in multiple arc, between said line-wires and passing through said plates and bands, a rheostat and switch in each of said circuits and means for reversing the direction of the current on said line-wires, substantially as described.

Signed in the city, county, and State of New York this 28th day of October, 1898.

JEAN THEODORE VAN GESTEL.

Witnesses:
JOSEPH L. LEVY,
WM. JACOBSEN.